United States Patent [19]

Megard et al.

[11] Patent Number: 5,513,310
[45] Date of Patent: Apr. 30, 1996

[54] METHOD FOR SELECTING A CONSTRUCTED ELEMENT OF A DRAWING TO GENERATE SIMILAR ELEMENTS

[76] Inventors: Patrick Megard, 9, rue Jean-Jaquet, 1201 Geneve; Serge Favre, 175, Rte de St-Julien, 1228 Plan-les-Ouates, both of Switzerland

[21] Appl. No.: 182,333

[22] Filed: Jan. 18, 1994

[30] Foreign Application Priority Data

Feb. 8, 1993 [CH] Switzerland ................ 378/93

[51] Int. Cl.⁶ .................................... G06F 15/00
[52] U.S. Cl. .................... 395/161; 395/155; 395/156; 395/133
[58] Field of Search ................... 395/155–161, 395/133–139; 345/117–120, 146, 902; 364/474.24

[56] References Cited

U.S. PATENT DOCUMENTS

| | | | |
|---|---|---|---|
| 4,868,766 | 9/1989 | Ousterholt | 395/161 |
| 4,912,657 | 3/1910 | Saxton et al. | 395/133 |
| 5,051,927 | 9/1991 | Tada et al. | 395/139 |
| 5,437,008 | 7/1995 | Gay et al. | 395/161 |

FOREIGN PATENT DOCUMENTS

| | | | |
|---|---|---|---|
| 0241071B1 | 10/1987 | European Pat. Off. | G06F 15/72 |
| 0241071 | 10/1987 | European Pat. Off. | G06F 15/72 |
| 0346517 | 12/1989 | European Pat. Off. | G06F 15/72 |
| 2675290 | 10/1992 | France | G06F 15/60 |

OTHER PUBLICATIONS

Mac Draw Pro User's Guide, Claris Corp. 1991, pp. 2–30 to 2–43, 3–1 to 3–49.
By G. Jense, "Voxel–based methods for CAD", Computer–Aided Design, Oct. 1989, vol. 21, No. 8, pp. 473, 528–533.
By K. Kondo, "PIGMOD: Parametric and Interactive Geometric Modeller for Mechanical Design", Computer–Aided Design, Jul./Aug. 1990, vol. 22, No. 6, pp. 321, 633–644.
By D. Breen et al., "Message–Based Object–Oriented Interaction Modeling", Eurographics '89, Sep. 1989, pp. 489–503.

Primary Examiner—Mark R. Powell
Assistant Examiner—John D. Breene
Attorney, Agent, or Firm—Young & Thompson

[57] ABSTRACT

A computer aided design (CAD) or computer aided manufacturing (CAM) system may be used to generate a drawing containing many elements with certain parameters. Commands or functions and their parameters that are used to generate the elements are stored for later retrieval. The user may directly select an element from the drawing displayed in another activated window or some part of the screen or on a digitizer. After a user selects the element, a similar element is automatically displayed. A menu may be displayed after selecting an element in order for the user to modify various parameters for the similar element.

7 Claims, 2 Drawing Sheets

METHOD FOR SELECTING A CONSTRUCTED ELEMENT OF A DRAWING TO GENERATE SIMILAR ELEMENTS

BACKGROUND OF THE INVENTION

1. Field of the Invention

The present invention is concerned with a computer aided design and manufacturing system.

2. Description of the Related Art

Conventional computer aided design and/or manufacturing systems, abbreviated hereafter to CAD/CAM, include generally a central calculating unit, a screen for making it possible to visually display the objects created and a device for entering data, such as a keyboard and/or a pointer device such as a mouse. These systems are equally provided with a user interface including programs which make it possible for the user to create or modify representations of objects by displaying them visually on the screen in two or three dimensions, so that they may be subjected to a subsequent treatment, such as for example printing on a sheet of paper or controlling a machine tool. When using such systems, the user is confronted with the problem of the initial training requiring that he memorizes a high number of commands and/or of operations for representing an object. In addition, after his training is completed, the user must often, when creating or modifying an object, carry out in a repetitive manner a series of commands or operations which are always identical for a given task, which results in increasing the time needed for the work. When a CAD/CAM system is used by a group of people, then there is the problem of standardizing the objects (drawings, plans, machining path, etc) within the company: actually, the flexibility offered by these CAD/CAM systems is such, that each user adopts a certain number of conventions or rules (options of construction in different planes, thickness of lines, type of hatching, character type), so that it becomes difficult for a person who has not executed the drawing, to modify it.

User interfaces with multiple windows make it possible to solve in part these problems. The use of a mouse, which makes it possible to move a pointer on the screen to select for example a command in a pull-down menu, diminishes the number of commands to memorize and enables a fast selection. However, for many commands, a high number of parameters must be introduced, which implies a succession of operations of the mouse in a cascade of menus appearing on the screen. Certain interfaces also use menus with icons representing diagrammatically the commands or the objects, and this improves the ergonomic aspects, but does not obviate either the need to define numerous parameters for certain operations.

The European patent EP 0 241 071 B1 teaches a CAD/CAM system using a method making it possible to create and process two-dimensional or three-dimensional models of objects and to display these models visually on a screen. A tree-structured diagram, associating a word to each hierarchical element of the object appears on the screen at the same time as the image of the model and the selection of a word in the structure diagram makes it possible to carry out an operation on the corresponding element, as well as on all the elements hierarchically inferior, thus eliminating the need to carry out this operation on each element of an inferior level. However, this system does not make it possible to decrease the number of commands or of operations to be carried out when entering the characteristic parameters of a command for creating a new model.

The purpose of the present invention is to reduce the number of operations or of commands to be carried out with a CAD/CAM system when creating a new object or when modifying an existing object. The present invention is equally aimed at improving the standardization of the results obtained with these systems, within a company.

SUMMARY AND OBJECT OF THE INVENTION

The object of the present invention is a CAD/CAM system using a method which obviates the above-mentioned drawbacks and which is characterized by the features set forth in claim 1.

BRIEF DESCRIPTION OF THE DRAWINGS

The annexed drawing illustrates schematically and by way of example certain steps of the method according to the present invention.

DETAILED DESCRIPTION OF THE INVENTION

Figure 1:
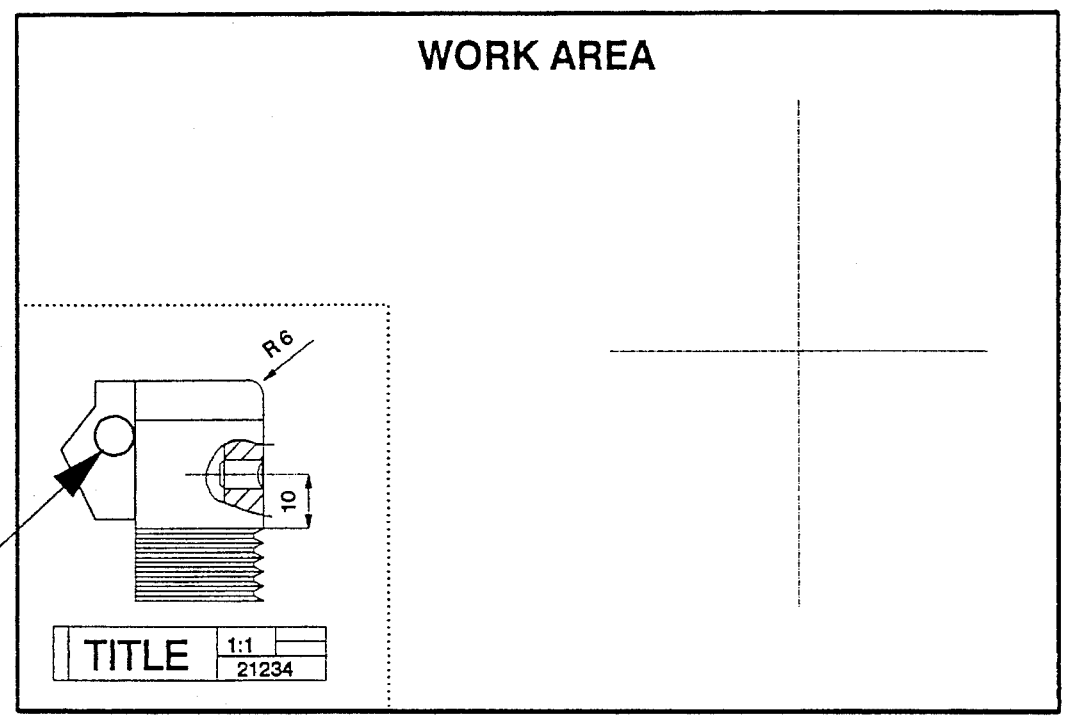
FIGS. 1 to 4 show the visual display device of the CAD/CAM system at different steps.

To describe the method object of the present invention, a CAD/CAM system will be used, which includes a screen, a keyboard, a pointer device such as a mouse, as well as a user interface with multiple windows which makes it possible to display in an area or window of the screen the representation in two or three dimensions of an object or of a tool path used for making the same. One will note that the number of windows as well as their layout is not important, and the user can chose their number, layout and size.

The following example concerns the execution of a drawing which the user will create by using the commands existing in the software of the CAD/CAM. An element is defined as any independent entity, part of the drawing, on which an operation may be carried out. A drawing consists of a collection of elements, each having certain attributes. An element of the drawing such as a straight line for example will have as attributes, amongst others, the thickness or the colour of its plot on the screen. The use of a command or of a function enables generally either to create a new element or to modify the attributes of an existing element. Each command or function may require that a certain number of parameters be defined beforehand. For example, the command which makes it possible to carry out a rotation of an element necessitates the introduction of the value of the angle of rotation. According to the parameters defined for a given command, one will obtain after the execution of said command, an element possessing certain attributes. Accordingly, an element assumes different aspects according to the parameters defined for the command which allowed its generation.

Generally, in the conventional CAD/CAM systems, the elements generated as well as their attributes are stored in the memory of the device, so that one can later display visually the drawing on the screen in order to bring modifications thereto. The method according to the present invention includes the following steps:

1. Selection of a command enabling the creation of an element, among those available in the CAD/CAM system.
2. Definition of the parameters pertaining to this command, in order to obtain an element possessing certain determined attributes.

3. Execution of the command actuating the visual display on the screen of the created element, as well as storing in a memory the type of element created and its attributes.
4. Storing into a memory the type of command which enabled the generation of said element, as well as the parameters associated with this command.
5. Steps 1 to 4 enable the elaboration of a reference element; they can be repeated.
6. Selection of one of the reference elements or of one of its attributes by means of the pointer device.
7. Operation of a control member of the pointer device for allowing access to the memory containing the information pertaining to the selected reference element and actuation of the command associated with this element, enabling as a result the creation of a similar element, the parameters associated with the command being by default the same as those introduced upon the creation of the reference element.

When carrying out the selection described in step 6, the operation of a second control member of the pointer device will result in the visual display on the screen of parameters associated with the command which made it possible to generate the selected element. This enables the user to create an element of the same type as the selected element, but having other attributes.

The different steps of the construction of a straight line will be detailed hereafter, by way of example.

Firstly, the level at which this straight line is to be constructed is defined. The use of different "levels" makes it possible to break down a complex drawing into a juxtaposition of planes. Thus, by constructing certain elements at different levels, one can obtain partial views of the object, which only include the elements found at one level. By placing for example at level 0 the elements of the structure of an object and at level 1 the elevations, one can, by actuating and/or by preventing the display of selected levels, visualize the object with or without elevations. Then the starting point must be defined and also the end point, as well as different parameters relating to the type of plot used (full line, dotted line, broken line, . . . ), the thickness of this line or the colour used for displaying this line on the screen. These different parameters are saved in the memory of the calculating unit, along with the information enabling to locate this straight line in the drawing. When one wishes to construct a second straight line, instead of actuating the menu for drawing lines with the mouse, then introducing the parameters relating to the thickness of the line, the type of line, etc, . . . as previously, the user will simply indicate by means of the mouse any point located on the first straight line and actuate one of the buttons of the mouse. In this operation and owing to the information stored in the memory during the construction of the first straight line, the system automatically switches to the "straight line creation" mode. To define a new straight line, it suffices then to define the two points between which the new straight line is to extend, and the parameters of thickness of the line as well as of the type of line and the level of construction used will be, by default, the same as those defined for the first straight line. Obviously, the parameters pertaining to the second straight line can be modified at a later time, if necessary.

Usually, when one proceeds to modify certain characteristics or attributes of an element such as for example the thickness of the line, he chooses in the menus with the pointer device, the command or the function which allow a modification of the thickness of a line and then he introduces into the system the value of the desired thickness. This may imply a relatively high number of operations, depending on the function or the characteristic which is to be modified. When one wishes to modify a characteristic of one element, he only needs, with the present invention, to select with the pointer device a characteristic similar on another element displayed on the screen to produce directly the parameters pertaining to the characteristics concerned. Thus for example, if one wishes to hatch a portion of the drawing displayed visually on the screen, he only needs to position the mouse on any other hatched area and actuate one of the buttons of the mouse to produce immediately on the screen the parameters which make it possible to modify the type of lines used for the hatching, the spacing and the slant of these lines.

If, as was described above, elements of a same drawing can be used as basis for creating a new element which "inherits" the characteristics of the element selected, it is also possible to make appear a drawing previously created and stored, in another window which can be activated on the screen, and then to select with the pointer device any element of this drawing so that the system creates an element of the same type possessing the same characteristics in a drawing being executed, located in another window of the screen of the device. To illustrate this point, reference will be made to the drawings which represent a simplified example provided for the purpose of illustrating the different steps. FIG. 1 shows the screen of the CAD/CAM system. In a first area on the screen located on the bottom left-hand side, there is displayed a drawing including various elements. An arrow P symbolizes the area of the screen addressed by the pointer device. The remaining of the screen is the work area in which the new drawing will be created.

Figure 2:
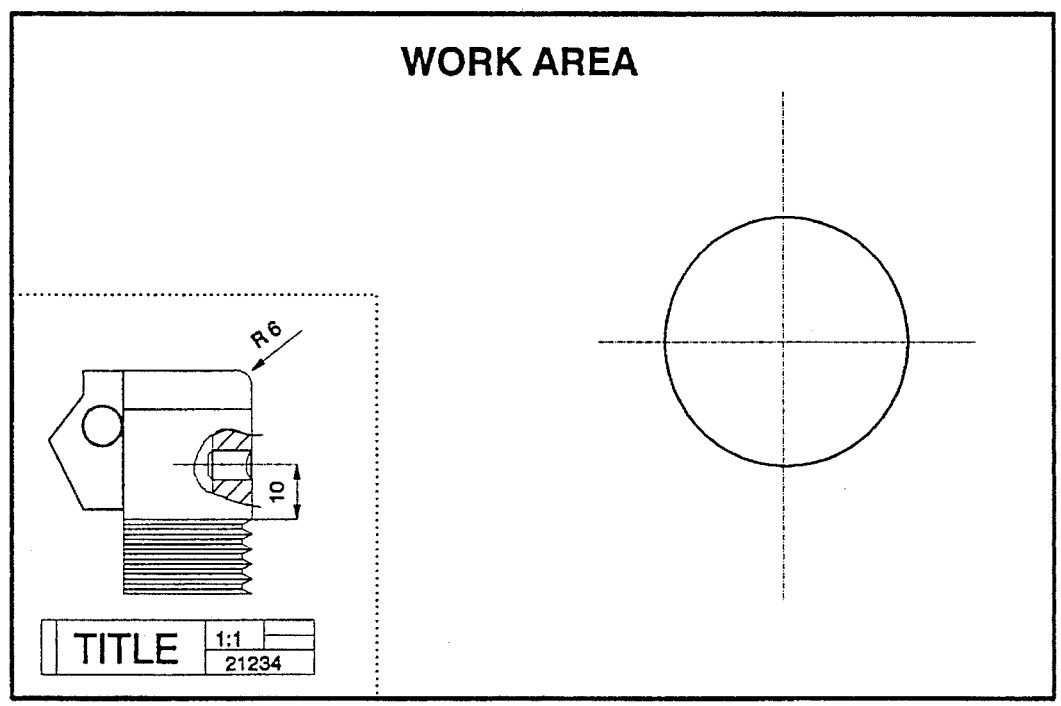
Figure 3:
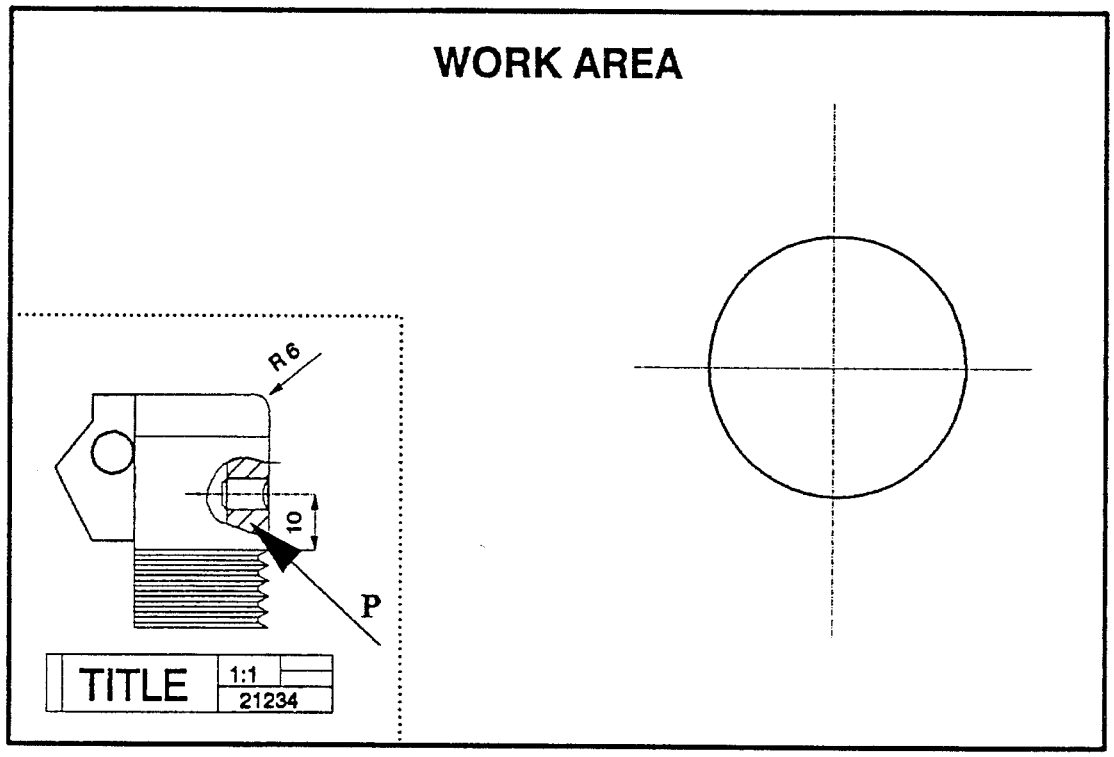
Figure 4:
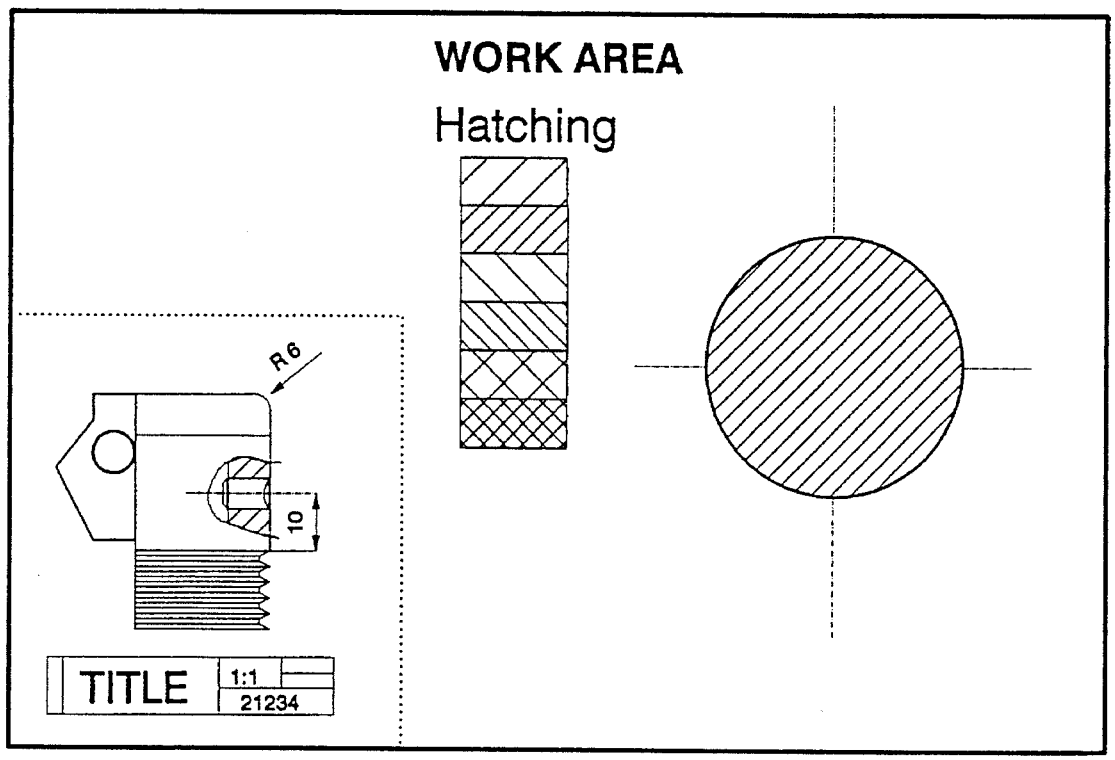

The first operation consists in selecting an element of the drawing displayed in the first area of the screen as indicated by the arrow P which is directed towards an element which is a circle. The system, after accessing to the information corresponding to the command which has enabled the creation of this circle, actuates the command for creating a circle exhibiting by default, all the parameters used for the creation of the first circle. FIG. 2 is a view of the screen on which one can see a new circle created in the work area. FIG. 3 illustrates the possibility of selecting an attribute for an element, with the arrow P pointing here to a hatched area. After actuating one of the control members of the pointer device, the system produces as shown in FIG. 4, a menu for accessing directly to the parameters pertaining to the command ensuring the hatching of an element. One only then needs to choose the type of hatching desired for applying it to an element.

One will further note that a device such as a digitizing table or digitizer, which also makes it possible to select by visual pointing any point of a drawing laid upon the table, can also be used as pointer device. In this ease, the selection is not carried out any more by moving a cursor on the screen by means of a mouse, but by using the digitizing table.

It is hence easy to create a reference drawing including the main design elements which will be the most frequently reproduced, and thereby decrease considerably the number of commands or operations to be carried out on the CAD/CAM, when executing new drawings. One will also note the evolutionary nature of the system for carrying the described method into effect, insofar as each new element created can in turn be used as reference element. When a reference drawing can be shared by several users in an installation including several CAD/CAM systems connected together in a computer network for example, the standardization of the drawings produced is considerably facilitated. In actual fact, the final aspect of the drawings will be uniform if the users employ the elements of the reference drawing for their new creations.

In the examples described above, reference is made to a straight line or to a circle, and further to the aspect of hatched areas, which are elements and a characteristic of a relatively simple nature. Clearly, the same method is applicable to any other more complicated element or characteristic, in particular in the area of three-dimensional CAD/CAM or in the area of machining tolerances.

Reference is made above to a "drawing", but the above obviously also applies to any other methods which can be carried out using CAD/CAM, such as for example defining machining paths.

The device which makes it possible to carry into effect the above described method comprises generally a microprocessor calculating unit provided with a memory (RAM), as well as with a bulk saving unit, such as a magnetic or optical disc. It further includes means which make it possible to display graphically an object as well as pointer means which make it possible to introduce orders into the system. The user interface on such systems can assume various forms. One can introduce the commands into the system for example by typing orders recognized by the system on a keyboard or by selecting a command in a menu displayed on the screen by using the pointer means. One can also consider the use of a digitizing table. A user interface with multiple windows will be preferred, in which one can operate selections in menus or with icons displayed on the screen, by means of a mouse. This system includes also output peripherals, such as printers or plotters. Such devices make it possible to carry into effect the method described above and hence to produce more rapidly and with less operations the expected results. In the ease of a collective use of such systems connected together in a computer network for example, the uniformity of the results will be considerably improved.

We claim:

1. A computer-implemented CAD/CAM method of creating and processing representations of objects in two or three dimensions and of reproducing said representations using at least one of a display means and a manufacturing means, comprising the steps of:

constructing a representation of at least one element, said at least one element possessing a plurality of attributes, each of said plurality of attributes being dependent on at least one parameter set by at least one computer command that generated said at least one element;

saving, in a memory of a computer, data corresponding to said at least one constructed element, said data comprising a type of said at least one constructed element, said plurality of attributes of said at least one constructed element, and data corresponding to a manner in which said at least one constructed element is linked to additional elements saved in said memory of said computer;

saving, in said memory, information corresponding to said at least one computer command that generated said at least one constructed element, and information corresponding to said at least one parameter set by said at least one computer command, said saved information thereby defining at least one reference element;

selecting, by means of a pointer device, one of said at least one constructed element and said at least one reference element;

automatically retrieving, from said memory, at least one of said at least one computer command and said at least one parameter, based on said selected one of said at least one constructed element and said at least one reference element;

automatically reproducing at least one other independent element sharing similar attributes as at least one of said constructed element and said at least one reference element using said at least one of said at least one computer command and said at least one parameter retrieved from said memory.

2. A computer-implemented CAD/CAM method according to claim 1, further comprising the step of:

displaying a representation of said reproduced at least one other independent element in an area of said display means.

3. A computer-implemented CAD/CAM method according to claim 1, wherein, in said selecting step, a digitizer is used to select said one of said at least one constructed element and said at least one reference element.

4. A computer-implemented CAD/CAM method according to claim 2, wherein, in said displaying step, said area of said display means coincides with a work area in which said representation of said constructed element is constructed.

5. A computer-implemented CAD/CAM method according to claim 2, wherein, in said displaying step, said area of said display means is different from a work area in which said representation of said constructed element is constructed.

6. A computer-implemented CAD/CAM method according to claim 1, further comprising a step of:

displaying, on said display means, a menu of said retrieved at least one of said at least one computer command and said at least one parameter.

7. A computer-implemented CAD/CAM method according to claim 1, wherein said at least one of said at least one computer command and said at least one parameter retrieved from said memory defines machining paths for manufacturing said reproduced at least one other element.

* * * * *